(12) United States Patent
de Lavarene et al.

(10) Patent No.: US 8,584,143 B2
(45) Date of Patent: Nov. 12, 2013

(54) COLLECTION ACCESS IN A PARALLEL ENVIRONMENT

(75) Inventors: Jean de Lavarene, Levallois Perret (FR); Paul Lo, Fremont, CA (US); Douglas Surber, Orinda, CA (US); Edward Shirk, Berkely, CA (US); Tong Zhou, Elmhurst, NY (US); Ashok Shivarudraiah, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1293 days.

(21) Appl. No.: 12/156,187

(22) Filed: May 30, 2008

(65) Prior Publication Data

US 2009/0300654 A1  Dec. 3, 2009

(51) Int. Cl.
*G06F 3/00* (2006.01)

(52) U.S. Cl.
USPC .......................................................... 719/318

(58) Field of Classification Search
None
See application file for complete search history.

(56) References Cited

U.S. PATENT DOCUMENTS

| | | | |
|---|---|---|---|
| 6,266,716 B1 * | 7/2001 | Wilson et al. | 710/33 |
| 7,370,054 B1 * | 5/2008 | Martin et al. | 707/747 |
| 2002/0165998 A1 * | 11/2002 | Hrebejk et al. | 709/318 |
| 2004/0193653 A1 * | 9/2004 | Howard et al. | 707/200 |
| 2005/0097567 A1 * | 5/2005 | Monnie et al. | 719/315 |
| 2006/0123427 A1 * | 6/2006 | Harold et al. | 719/318 |
| 2009/0089807 A1 * | 4/2009 | Cabillic et al. | 719/318 |

* cited by examiner

*Primary Examiner* — Sam Sough
*Assistant Examiner* — Carina Yun (57) ABSTRACT

Systems, methods, and other embodiments associated with collection access are described. One example system includes a data store to store a set of listener object identifiers. A listener object identifier identifies a member of a set (or collection) of listener objects. A Listener object initiates an action in response to an occurrence of an event associated with a member of a set of external logics. A member of the set of external logics invokes a notify process to trigger actions. The example system may also include storing the listener object identifiers in an array to allow instances of the notify process to operate in parallel.

10 Claims, 7 Drawing Sheets

COLLECTION ACCESS IN A PARALLEL ENVIRONMENT

BACKGROUND

In many software applications, a design pattern known as an event/listener pattern is used to process input. Some typical implementations of event/listeners may use a listener manager to store a collection of listener objects. Conventional listener managers may use a linked list data structure to store listener objects. Linked lists may be used because add and remove operations in linked lists are fast, low cost operations. Arrays, a common alternative to linked lists, may take much more time and memory to run add and remove operations. Adding and removing elements to an array may require that array elements be copied or that the array be resized. Array resizing and array element copying are slow, memory expensive operations.

To inform a listener object that an event has happened, a notify operation is used to convey information relating to the event to the listener object. In the linked list implementation, the notify process iteratively goes through the linked list, reporting information relating to the event to listener objects. A listener object may then invoke an external process in response to the information. However, linked list listener managers may be constrained by potential race conditions. Because add and remove calls may temporarily break links, all three operations (add, remove, and notify) may be required to be written into a synchronized block. This may prevent notify processes from running in parallel. In high performance machines, this may reduce performance.

To further illustrate conventional listener managers, Java® code describing one typical listener manager implementation is provided below. While the example code is written in the Java® programming language, it is to be appreciated that event listeners are also used in other programming languages. Note that all three functions (addListener, removeListener, and notify) use a synchronization qualifier to prevent other functions from operating in parallel.

```
class ListenerManager
{
        LinkedList listeners;
        //Adds a listener to the list of registered listeners.
        synchronized void addListener(Listener 1)
        {       listeners.add(1);       }
        //Removes a listener from the list of registered listeners.
        synchronized void removeListener(Listener 1)
        {       listeners.remove(1);    }
        //Notify all the registered listeners.
        synchronized void notify(EventObject e)
        {
                ListIterator iterator = listeners.listIterator( );
                while(iterator.hasNext( ))
                        ((Listener)iterator.next( )).handleEvent(e);
        }
}
```

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example systems and methods associated with an event/listener pattern are described. In one example, a system uses a read-only array to manage listener objects. As described above, slow add and remove operations may be side effects of array based listener managers. However, by using a read-only array manipulated by atomic assignments, notify processes may operate without synchronization. This may allow notify processes to operate in parallel with other notify processes. The example system may still synchronize add and remove operations to avoid race condition issues related to multiple write processes operating at the same time.

By way of illustration, an external logic may initiate a first notify process (N1) and a second notify process (N2). N1 and N2 may receive pointers to an array containing listener objects (L1). While N1 and N2 are operating, an external logic may initiate a write process (W1) to modify the array. W1 may create a new array (L2) and overwrite the pointer in memory to L1 with a pointer to L2. If an external logic initiates a third notify process (N3) while W1 is operating, N3 receives a pointer to L1. If an external logic initiates a fourth notify process (N4) after W1 has completed, N4 receives a pointer to L2. Once N1, N2, and N3 have completed, L1 may be cleared from memory. In the linked list architecture, the notify processes and the write process may be forced to operate in series. As multiple notify processes are operating in parallel in the example, higher performance system operation may be achieved.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.

CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
SQL: structured query language.
OQL: object query language.
USB: universal serial bus.
XML: extensible markup language.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
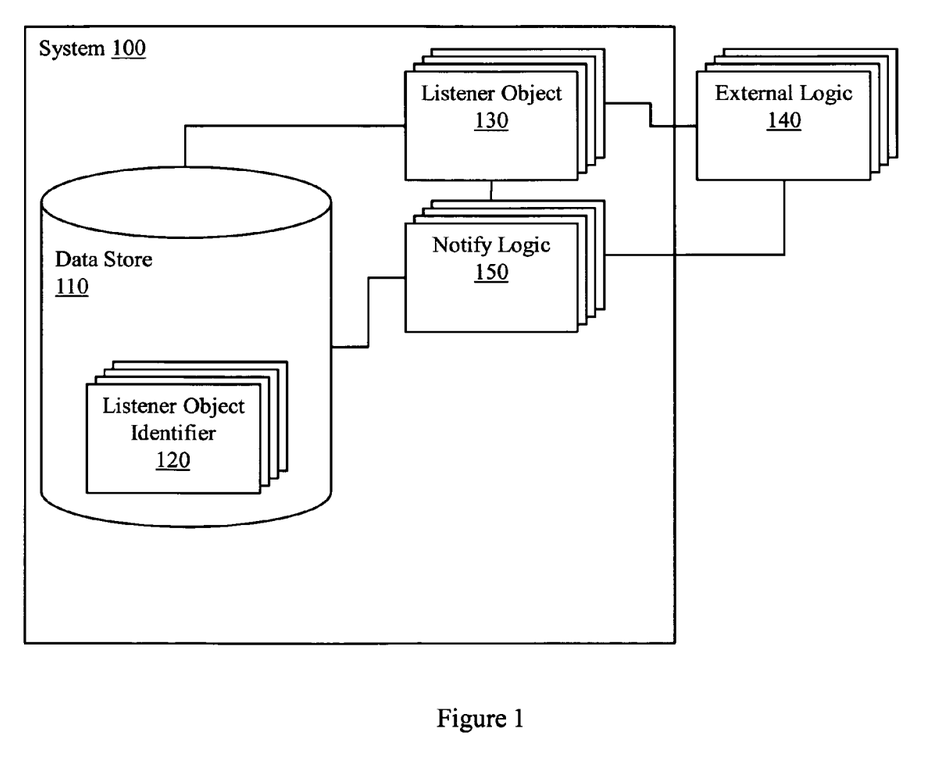
FIG. 1 illustrates an example system associated with listener managers.

FIG. 1 illustrates a system 100 associated with listener managers. System 100 includes a data store 110. Data store 110 may store a set of listener object identifiers (LOID) 120. LOIDs, may be, for example, pointers, handles, links, and so on. In one example, the set of LOIDs 120 may be stored in an array. While an array is used in this example, it is to be appreciated that other data structures may also be employed. In one example, the set of LOIDs may be a read-only set. Write logics may acquire a copy of the set of LOIDS to manipulate to generate an updated set of LOIDs. The updated set of LOIDs may eventually replace an old set of LOIDs. A member of the set of LOIDs 120 may identify a member of a set of listener objects 130. A listener object may be programmed to initiate an action associated with a member of the set of external logics 140 in response to an occurrence of an event associated with a member of the set of external logics 140. One with ordinary skill in the art will appreciate that the member of the set of external logics associated with the initiated action and the member of the set of external logics associated with the occurrence of the event may be different external logics. A member of the set of external logics 140 may be, for example, a database logic, an enterprise management logic, a weather tracking logic, a business logic, an entertainment logic, a security logic, a communication logic, and so on. Therefore, the event may be, for example, a database change notification, a database query, a database generation request, a database update request, a database drop request, a user driven input, a logic driven input, a change of a stored value, a receipt of a signal, a provision of a signal, and so on.

In one example, members of the set of external logics 140 may be associated with weather tracking. A weather forecast logic may provide event signals to notify listeners of various weather patterns. One example event signal may be a tornado alert. Logics associated with alarms, radio warning systems, television warning systems, and so on, may listen for a tornado alert signal to perform an action in response to a detection of a tornado. In another example, members of the set of external logic 140 may be associated with a database environment. An example event may include a database change event. An example listener may be a data cache that may invalidate cache data in response to receiving notification of the database change event.

System 100 also includes a notify logic 150. Notify logic 150 may receive an event signal from a member of the set of external logics 140. In response to receiving the event signal, notify logic 150 may atomically create a reference to the set of LOIDs 120. An atomic action is an action that cannot be interrupted by, for example, a parallel running process or thread. In response to receiving the event signal, notify logic 150 may also provide event notification data to a member(s) (e.g., all members) of the set of listener objects 120. Thus, system 100 describes a system that allows multiple instances of notify logic 150 to operate in parallel. This may allow high performance machines to handle more notify requests than a machine with a notify logic that utilizes synchronization. Furthermore, notify logic 150 may operate in parallel with a concurrently running write process. Even if the set of LOIDs is replaced by the write process, because the notify logic 150 has a unique handle to the set of LOIDS on which it is operating, notify logic 150 will not be interrupted.

Figure 2:
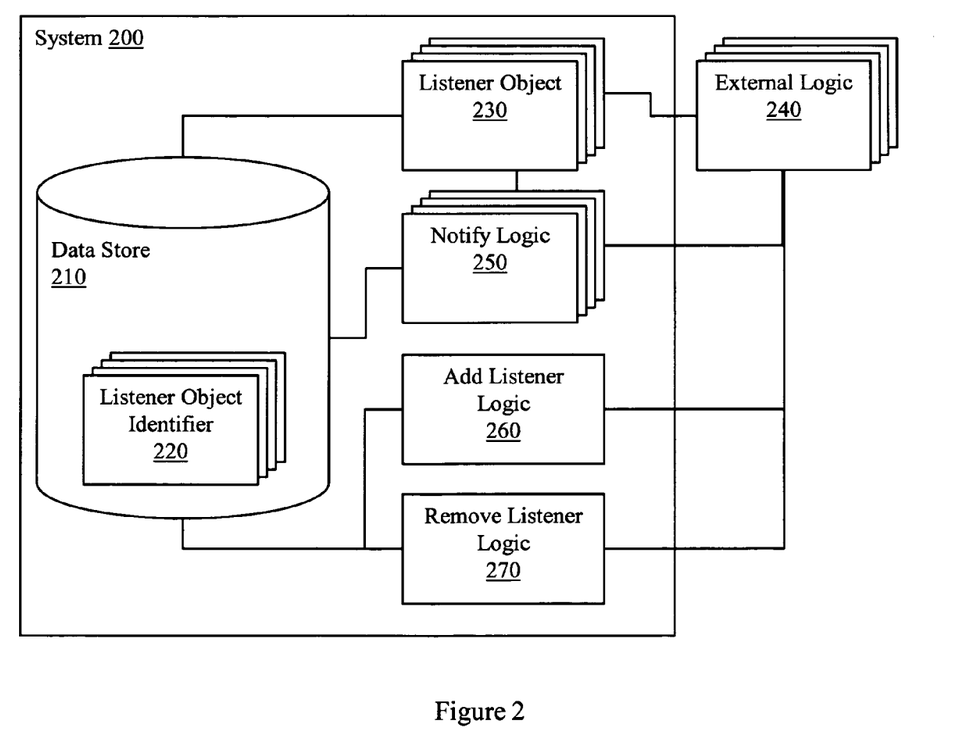
FIG. 2 illustrates an example system associated with listener managers.

FIG. 2 illustrates a system 200 associated with listener managers. System 200 includes several items similar to those described in connection with system 100 (FIG. 1). For example, system 200 includes a data store 210 to store a set of LOIDs 220 that identify members of a set of listener objects 230 that provide event notifications to members of a set of external logics 240. System 200 also includes a notify logic 250 to receive an event signal and to initiate an action. However, system 200 may include additional elements.

System 200 also includes an add listener logic 260. Add listener logic 260 may receive an add listener signal from a member of the set of external logics 240. In response to receiving the add listener signal, add listener logic 260 may acquire a copy of the set of LOIDs 220. Add listener logic 260 may then add a LOID to the copy of the set of LOIDs to produce an updated set of LOIDs. Add listener logic 260 may then atomically replace the set of LOIDs 220 with the updated set of LOIDs. Recall that an atomic action is an action that cannot be interrupted by, for example, a parallel running process or thread. The member of the set of external logics 240 may provide the add listener signal so that notify logic 250 is able to initiate an action associated with a member of the set of external logics 240 of an occurrence of an event. Add listener logic 260 may be programmed with a synchronization lock to control access to set of LOIDs 220. However, the synchronization lock will not block execution of notify processes.

System 200 also includes a remove listener logic 270. Remove listener logic 270 may to receive a remove listener signal from a member of the set of external logics 240. In response to receiving the remove listener signal, remove listener logic 270 may acquire a copy of the set of LOIDs 220. Remove listener logic 270 may then remove a LOID from the copy of the set of LOIDs to produce an updated set of LOIDs. Remove listener logic 270 may then atomically replace the set of LOIDs 220 with the updated set of LOIDs. The member of the set of external logics 240 may provide the remove listener signal so that notify logic 250 no longer initiates an action associated with a member of the set of external logics 240. Remove listener logic 270 may be programmed with a synchronization lock to control access to set of LOIDs 220. However, the synchronization lock will not block execution of notify processes. Thus, having a notify logic 250, an add listener logic 260, and a remove listener logic 270, system 200 may function as a typical event listener. However, by allowing multiple notify processes from running in parallel, system 200 may allow performance gains over systems that do not facilitate parallel operation.

Figure 3:
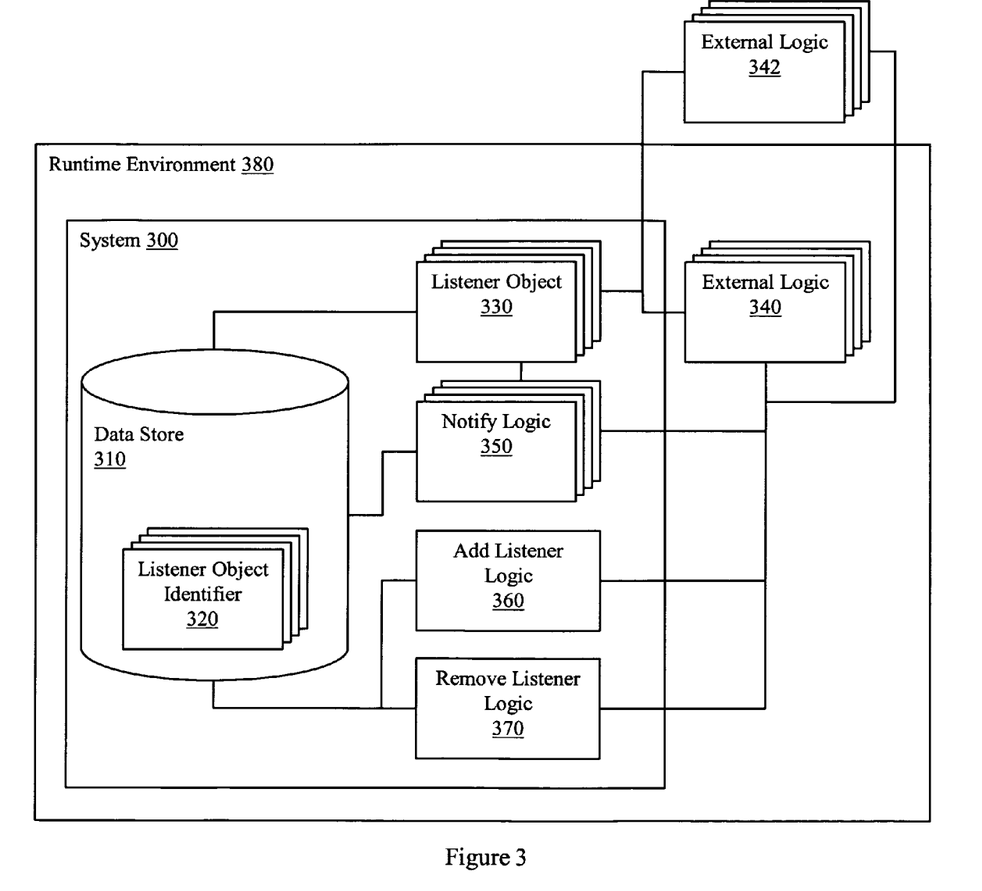
FIG. 3 illustrates an example system associated with listener managers.

FIG. 3 illustrates a system 300 associated with listener managers. System 300 includes several items similar to those described in connection with system 200 (FIG. 2). For example, system 300 includes a data store 310 to store a set of LOIDs 320 that identify members of a set of listener objects 330 that provide event notification to members of sets of external logics 340 and 342. System 300 also includes a notify logic 350 to receive an event signal and to provide event notification data, an add listener logic 360, and a remove listener logic 370. However, system 300 is illustrated interacting with a runtime environment 380. Runtime environment 380 may be, for example, a Java® runtime environment, a C++ runtime environment, a Python® runtime environment, a C# runtime environment, a Visual Basic® runtime environment, a .NET runtime environment, an ActionScript® runtime environment, a PHP runtime environment, and so on. Some members of set of external logics 340 may also interact with runtime environment 380. Some members of set of external logics 342 may interact with runtime environments not otherwise associated with system 300.

One example Java® implementation of a listener manager is provided below. While example code is written in the Java® programming language, it is to be appreciated that event listeners are also used in other programming languages. Note that unlike a typical system, the notify function does not include a synchronized qualifier.

```
class FastListenerManager
{
        Listener[ ] listeners;
        //Adds a listener to the list of registered listeners.
        synchronized void addListener(Listener l)
        {
                //Allocate memory for a new listener array.
                Listener[ ] newArr= new Listener[listeners.length+1];
                //Copy data from the old listener array to the new array.
                System.arraycopy(listeners,0,newArr,0,listeners,length);
                //Add the new listener object to the end of the new array.
                newArr[listeners.length] = l;
                //Update the listeners pointer to point to the new array.
                listeners = newArr; //atomic assignment
        }
        //Removes a listener from the list of registered listeners.
        //In this example, it is assumed that the listener is registered.
        synchronized void removeListener(Listener l)
        {
                //Allocate memory for a new listener array.
                Listener[ ] newArr = new Listener[listeners.length−1];
                int offset = 0;
                /*
                *Copy listeners from the old array to the new array.
                *If the listener being copied is the same as the
                *designated listener (l) it is skipped, thus
                *removing it from the array.
                */
                for(int i=0;i<listeners.length;i++)
                        if (listeners[i] != l)
                                newArr[offset++] = listeners[i];
                //Update the listeners pointer to point to the new array.
                listeners = newArr; //atomic assignment
        }
        //Notify the registered listeners.
        void notify(EventObject e)
        {
                //Get a local handle through atomic assignment.
                Listener[ ] localHandle = listeners;
                /*
                *Iterate through the listener array identified by
                *the listeners pointer.  Note that it does not
                *matter how long the handleEvent( ) function takes or
                *if it fails.  If an add or remove process is
                *initiated, notify processes that are started before
                *and while the add or remove process is running will
                *continue to use the array pointed to by the
                *listeners variable.  Notify processes started after
                *the add or remove process has ended will use the
                *new array. The old array will still be in memory
                *until all notify functions using it have ended.  In
                *the case of Java®, the old array will be
                *automatically garbage collected after no processes
                *are using it.
                */
                for(int i=0;i<localHandle.length;i++)
                        localHandle[i].handleEvent(e);
        }
}
```

As the notify function does not include the synchronized qualifier, multiple instances of the notify function may operate in parallel. In high performance machines, this may result in faster processing.

Figure 4:
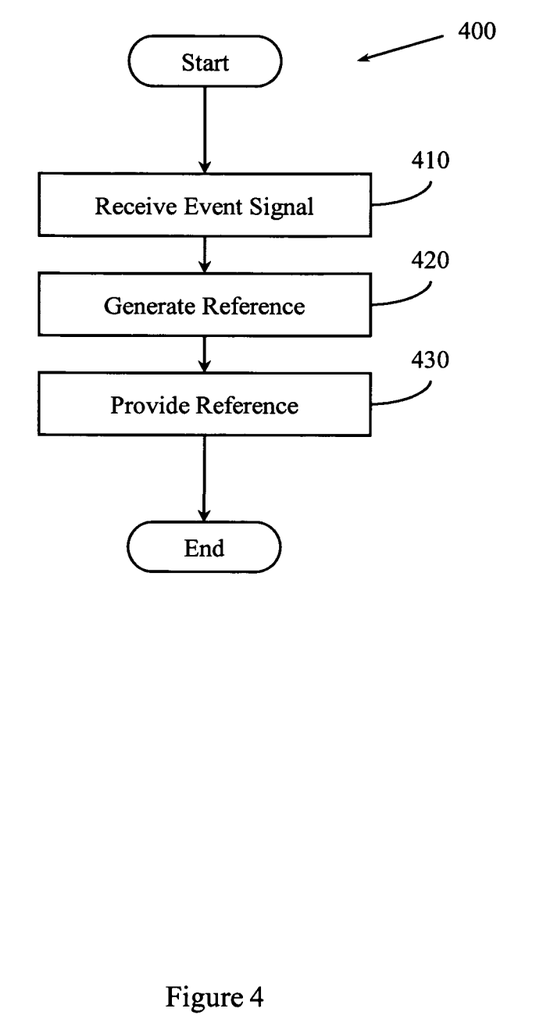
FIG. 4 illustrates an example method associated with listener managers.

FIG. 4 illustrates a method 400 associated with listener managers. Method 400 may interact with one or more of, a Java® runtime environment, a C++ runtime environment, a Python® runtime environment, a C# runtime environment, a Visual Basic® runtime environment, a .NET runtime environment, an ActionScript® runtime environment, a PHP runtime environment, and so on. Method 400 may include, at 410, receiving an event signal from a member of a set of external logics. The event signal may be sent in response to, for example, a user driven input, a logic driven input, a change of a stored value, a receipt of a signal, the provision of a signal, and so on. The member of the set of external logics may be, for example, a database logic, an enterprise management logic, a weather tracking logic, a business logic, an entertainment logic, a security logic, a communication logic, and so on.

Method 400 may also include, at 420, atomically generating a reference to a set of event tracker indicators. An event tracker indicator may identify a member of a set of listener objects. An event tracker indicator may be, for example, a handle, a pointer, a link, and so on. A listener object may be programmed to initiate an action in response to an event associated with a member of the set of external logics. The event tracker indicators may be stored in an array. Method 400 may also include, at 430, providing the reference to an instance of a notify process. The notify process may initiate an action associated with a member of the set of external logics. The notify process may be a member of a set of instances of the notify process. Members of the set of instances of the notify process may be programmed to operate in parallel.

While FIG. 4 illustrates various actions occurring in serial, it is to be appreciated that various actions illustrated in FIG. 4 could occur substantially in parallel. By way of illustration, a first process could receive an event signal, a second process could generate the reference, and a third process could provide the reference to the instance of the notify process. While three processes are described, it is to be appreciated that a greater and/or lesser number of processes could be employed and that lightweight processes, regular processes, threads, and other approaches could be employed.

In one example, a method may be implemented as computer executable instructions. While executable instructions associated with method 400 are described as being stored on a computer-readable medium, it is to be appreciated that executable instructions associated with other example methods described herein may also be stored on a computer-readable medium.

Figure 5:
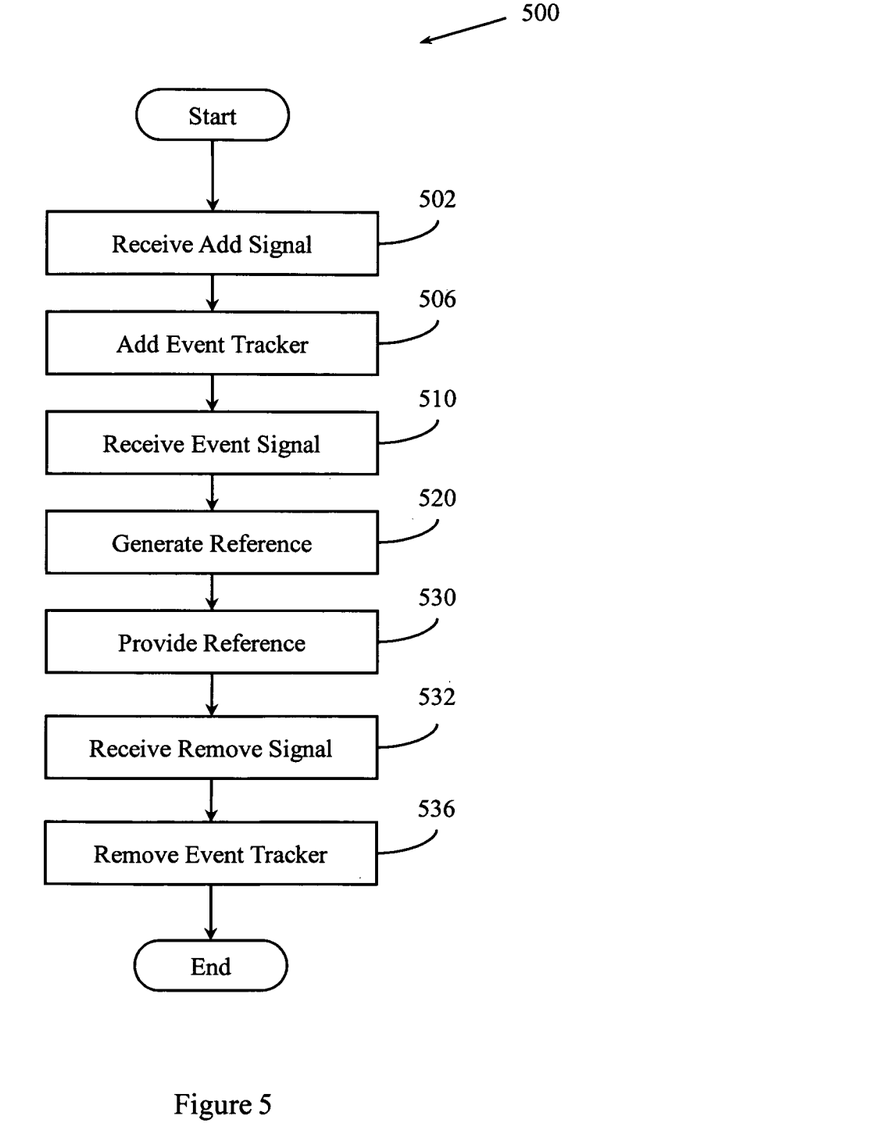
FIG. 5 illustrates an example method associated with listener managers.

FIG. 5 illustrates a method 500 associated with listener managers. Method 500 includes several actions similar to those described in connection with method 400 (FIG. 4). For example, method 500 includes receiving an event signal at 510, generating a reference at 520, and providing the reference at 530. However, method 500 may include additional actions.

Method 500 may include, at 502, receiving an add listener signal from a member of the set of external logics. The notification may be received to facilitate a member of the set of external logics performing a task associated with the event. Method 500 may also include, at 506, in response to receiving the add listener signal, adding an event tracker indicator to the set of event tracker indicators. Adding an event tracker indicator to the set of event tracker indicators may include acquiring a copy of the set of event tracker indicators, adding an event tracker indicator to the copy of the set of event tracker indicators to produce an updated set of event tracker indicators, and atomically replacing the set of event tracker indicators with the updated set of event tracker indicators. Adding an event tracker indicator to the set of event tracker indicators may be controlled by a synchronization lock. The synchronization lock may facilitate preventing multiple writing functions from operating in parallel. This may avoid some race conditions.

Method 500 may also include, at 532, receiving a remove listener signal from a member of the set of external logics. The remove listener signal may be sent, for example, because a task associated with the event has been completed, or because a process has terminated. Method 500 may also include, at 536, in response to receiving the remove listener signal, removing an event tracker indicator from the set of event tracker indicators. Removing an event tracker indicator from the set of event tracker indicators may include acquiring a copy of the set of event tracker indicators, removing an event tracker indicator from the copy of the set of event tracker indicators to produce an updated set of event tracker indicators, and atomically replacing the set of event tracker indicators with the updated set of event tracker indicators. Removing an event tracker indicator from the set of event tracker indicators may be controlled by a synchronization lock.

Figure 7:
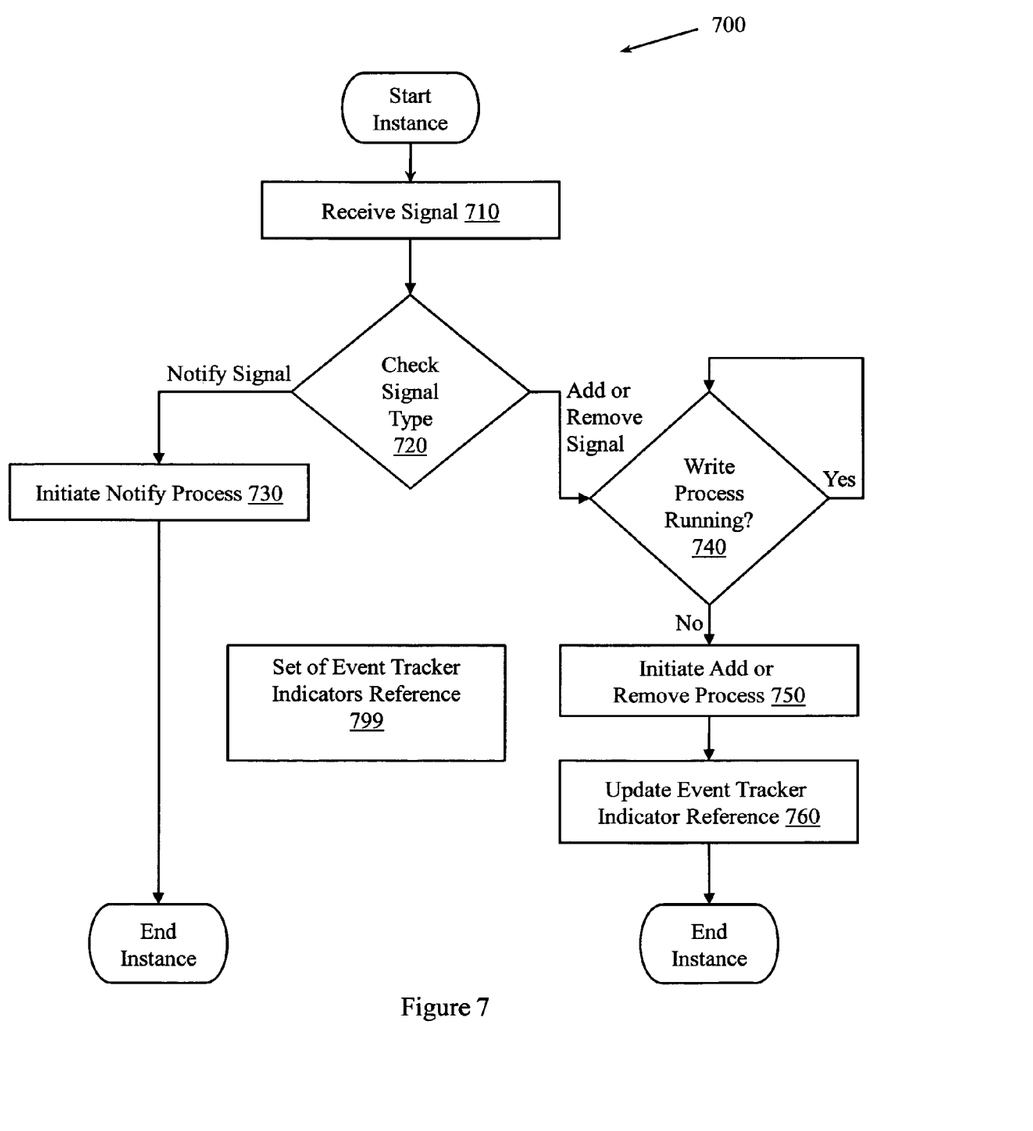
FIG. 7 illustrates one embodiment of an example logic flow associated with listener managers.

FIG. 7 illustrates an example logic flow 700 associated with listener managers. Logic flow 700 includes, at 710, receiving a signal from a member of a set of external logics. The signal may initiate an operation to be performed on a set of event trackers associated with a set of event tracker indicators reference 799. An event tracker may initiate an action in response to an event.

Logic flow 700 also includes, at 720, determining the type of signal received at 710. In one example, the signal received may be a notify signal. In the case that a notify signal is detected, logic flow 700 may proceed, at 730, by initiating a notify process. Initiating a notify process at 730 may include generating an independent reference to the set of event tracker indicators from the reference to the set of event tracker indicators 799. Generating the independent reference to the set of event tracker indicators may facilitate parallel operation of multiple instances of notify process. After the notify process has been initiated at 730, the operating instance of logic flow 700 may end. Ending is logic flow 700 may free system resources. The now free system resources may be used by other parallel operating processes, to initiate a new process, and so on. The newly initiated process may be a new instance of logic flow 700. This may allow multiple instances of the notify process to operate in parallel. Note that an instance of the notify process will acquire its own independent reference to the set of event tracker indicators.

In another example, the signal received at 710 may be a write signal. For example, an add signal or a remove signal may initiate a process that updates the set of event tracker indicators. In the event that an add signal or a remove signal is detected at 720, logic flow 700 may proceed, at 740, by determining whether another write process (e.g., add process, remove process) is already operating. In the event that an operating write process is detected, logic flow 700 may wait for the write process to end and then recheck to determine if a new write process has started. While logic flow 700 is waiting, new instances of logic flow 700 may continue to initiate. In the event that a notify signal is detected in a newly initiated instance, a notify process will be initiated and the associated instance of logic flow 700 will terminate as described above. In the event that an additional write signal is detected in a newly initiated instance, the associated instance of logic flow 700 will also wait for the write process to end. In one example a queuing system or a priority system may be implemented to manage the order of waiting write processes. However, one with ordinary skill in the art may see how other ordering systems, or no ordering systems may also be applied.

If it is determined at 740 that no write process is presently operating, then logic flow 700 may proceed, at 750, by initiating the requested add or remove process. Initiating an add process or a remove process may include generating an independent copy of the set of event tracker indicators by accessing the reference to the set of event tracker indicators 799. The independent copy of the set of event tracker indicators may allow the add process or the remove process to independently operate on the set of event tracker indicators and to update the set of event tracker indicators based on information contained in the signal received at 710. Based on information contained in the signal received at 710, the add process or the remove process may generate an updated reference to an updated set of event tracker indicators. After the completion of the add process or the remove process, logic flow 700 includes, at 760, updating the event tracker indicator reference. Updating the event tracker indicator reference may include replacing the event tracker indicator reference with the reference to the updated set of event tracker indicators.

Figure 6:
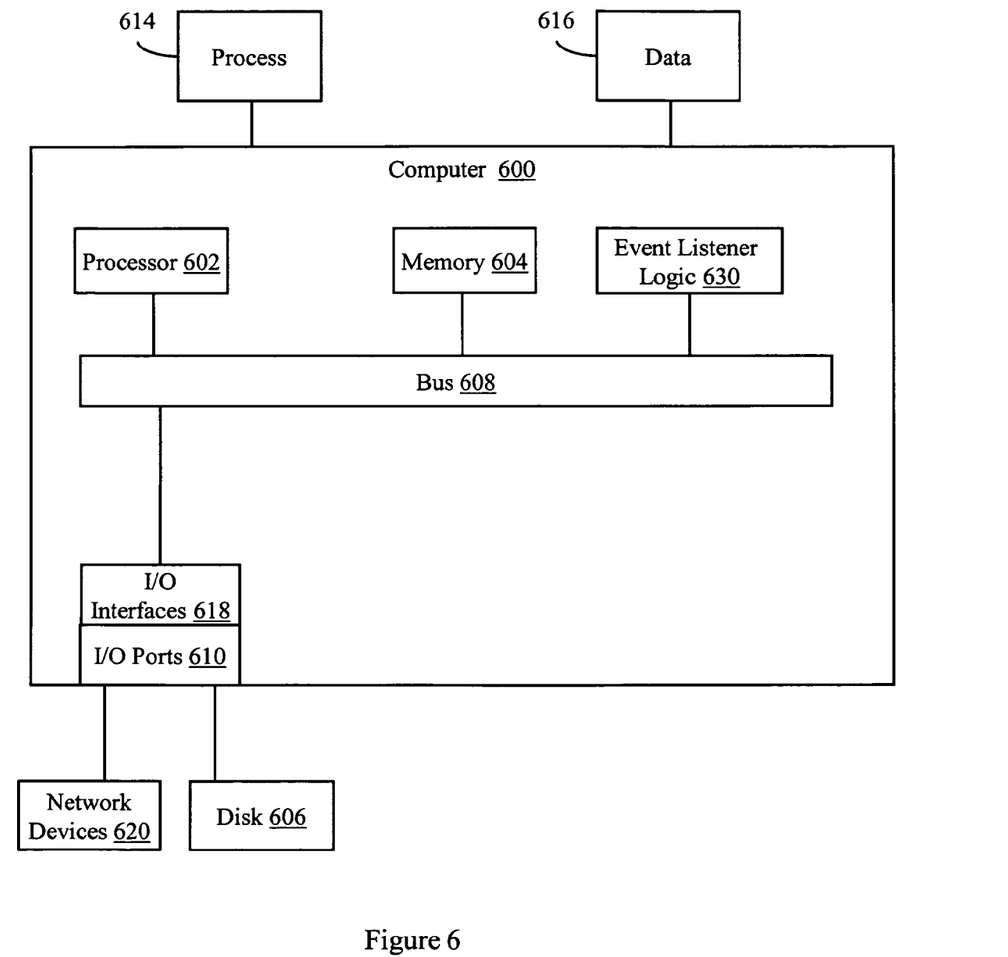
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include an event listener logic 630 configured to facilitate monitoring events. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602.

Thus, logic 630 may provide means (e.g., hardware, software, firmware) for storing a set of observer associations. An observer association identifies a member of a set of listener objects. A listener object may be programmed to supply notification of an occurrence of an event to a member of a set of external logics. Logic 630 may also provide means (e.g., hardware, software, firmware) for receiving an event signal from a member of the set of external logics. Logic 630 may also provide means (e.g., hardware, software, firmware) for atomically generating a reference to the set of observer associations. Recall that an atomic assignment is an assignment that cannot be interrupted by, for example, other processes and threads. Logic 630 may also provide means (e.g., hardware, software, firmware) for providing the reference to an instance of a notify process. The notify process may provide an event notification signal to a member of the set of listener objects. The instance of the notify process may be a member of a set of instances of the notify process. Members of the set of instances of the notify process may be programmed to operate in parallel. The means associated with logic 630 may be implemented, for example, as an ASIC. The means may also be implemented as computer executable instructions that are presented to computer 600 as data 616 that are temporarily stored in memory 604 and then executed by processor 602.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
   a non-transitory computer readable medium that stores executable instructions that implement a listener manager that is configured to control, via at least a processor, a set of listener objects stored in a first data structure wherein a first pointer is assigned to point to the first data structure, where a listener object is programmed to initiate an action in response to an occurrence of an event; and
   wherein a first notify process, executable by the processor, is configured to use the first pointer to provide notice messages to one or more of the listener objects in the first data structure;
   wherein the listener manager is configured to modify the set of listener objects in response to a modify request that adds or removes a specified listener object from the set of listener objects by:
   generating a copy of the set of listener objects from the first data structure into a second data structure;
   assigning a second pointer that points to the second data structure;
   modifying the second data structure by adding or removing the specified listener object in the second data structure, wherein modifying the second data structure occurs in parallel with the first notice process providing the notice messages to the one or more listener objects in the first data structure; and
   providing the second pointer to a second notify process that initiates after completion of the modify request, wherein the second notify process provides notice messages to one or more of the listener objects in the second data structure based on at least the second pointer;
   wherein the listener manager is configured with an add listener logic that, in response to receiving the modify request that requests to add the specified listener object, is configured to:
   modify the second data structure by adding the specified listener object in the second data structure; and
   replace the first data structure with the second data structure after the modify request is completed by providing the second pointer to subsequent processes, wherein the add listener logic is configured to replace the first data structure with an atomic action performed by the processor that is not interruptible by a parallel running thread.

2. The system of claim 1, wherein the first data structure that stores the set of listener objects is an array that is configured as read-only.

3. The system of claim 1, wherein the system is configured to interact with a runtime environment.

4. The system of claim 1, wherein the listener manager is configured to initiate multiple instances of the notify process prior to completion of the modify request, wherein the multiple instances of the notify process execute in parallel and provide notice messages to the one or more listener objects in the first data structure using the first pointer while the listener manager modifies the second data structure.

5. The system of claim 1, wherein the listener manager is further configured to include a remove listener logic, that in response to receiving the modify request that requests to remove the specified listener object, is configured to:
  generate the copy of the set of listener objects from the first data structure without copying the specified listener object into the second data structure; and
  replace the first data structure with the second data structure after the modify request is completed by providing the second pointer to subsequent processes.

6. The system of claim 1, wherein the listener manager is further configured to replace the first data structure with the second data structure after completion of the modify request and to replace the first pointer with the second pointer to cause subsequent processes to use the second data structure.

7. A computer-implemented method comprising:
  controlling, via at least a processor, a set of listener objects stored in a first data structure wherein a first pointer is assigned to point to the first data structure, wherein a listener object is programmed to initiate an action in response to an occurrence of an event;
  executing, by at least the processor, a first notify process that uses the first pointer to provide notice messages to one or more of the listener objects in the first data structure;
  modifying the set of listener objects in response to a modify request that adds or removes a specified listener object from the set of listener objects by:
    generating a copy of the set of listener objects from the first data structure into a second data structure;
    assigning a second pointer that points to the second data structure;
    modifying the second data structure by adding or removing the specified listener object in the second data structure, wherein modifying the second data structure occurs in parallel with the first notice process providing the notice messages to the one or more listener objects in the first data structure; and
    providing the second pointer to a second notify process that initiates after completion of the modify request, wherein the second notify process provides notice messages to one or more of the listener objects in the second data structure based on at least the second pointer;
  wherein in response to receiving the modify request that requests to add the specified listener object, the modifying comprises: (i) modifying the second data structure by adding the specified listener object in the second data structure; and (ii) replacing the first data structure with the second data structure after the modify request is completed wherein the replacing includes providing the second pointer to subsequent processes, wherein the replacing is performed by the processor with an atomic action that is not interruptible by a parallel running thread.

8. The method of claim 7, further comprising initiating multiple instances of the notify process prior to completion of the modify request, wherein the multiple instances of the notify process execute in parallel and provide notice messages to the one or more listener objects in the first data structure using the first pointer while the second data structure is modified.

9. The method of claim 7, wherein the modify request is a request to remove the specified listener object, and wherein modifying the set of listener objects includes:
  generating the copy of the set of listener objects from the first data structure without copying the specified listener object into the second data structure; and
  replacing the first data structure with the second data structure after the modify request is completed by providing the second pointer to subsequent processes.

10. The method of claim 7, further comprising replacing the first data structure with the second data structure after completion of the modify request and replacing the first pointer with the second pointer to cause subsequent processes to use the second data structure.

* * * * *

UNITED STATES PATENT AND TRADEMARK OFFICE
CERTIFICATE OF CORRECTION

PATENT NO. : 8,584,143 B2
APPLICATION NO. : 12/156187
DATED : November 12, 2013
INVENTOR(S) : de Lavarene et al.

Page 1 of 1

It is certified that error appears in the above-identified patent and that said Letters Patent is hereby corrected as shown below:

On the Title Page

Column 1, under Item (75) "Inventors", line 4, delete "Berkely," and insert -- Berkeley, --, therefor.

Column 2, under Item (57) "Abstract", line 5, delete "Listener" and insert -- listener --, therefor.

In the Specification

In column 5, line 18, delete "LOIDs," and insert -- LOIDs --, therefor.

In column 7, line 26, delete "listeners,length);" and insert -- listeners.length); --, therefor.

In column 9, line 45, after "Ending" delete "is".

Signed and Sealed this
Third Day of June, 2014

Michelle K. Lee
*Deputy Director of the United States Patent and Trademark Office*